United States Patent [19]

Yamada

[11] Patent Number: 4,945,469
[45] Date of Patent: Jul. 31, 1990

[54] HIGH SPEED STACK CIRCUIT FOR REGISTER DATA IN A MICROCOMPUTER

[75] Inventor: Kenji Yamada, Kawasaki, Japan

[73] Assignee: Fujitsu Limited, Kawasaki, Japan

[21] Appl. No.: 420,688

[22] Filed: Oct. 11, 1989

Related U.S. Application Data

[63] Continuation of Ser. No. 863,886, May 16, 1986, abandoned.

[30] Foreign Application Priority Data

May 17, 1985 [JP] Japan ................. 60-105572

[51] Int. Cl.$^5$ .......................... G06F 9/46; G06F 13/40
[52] U.S. Cl. .................... 364/200; 364/254.2
[58] Field of Search ... 364/200 MS File, 900 MS File; 365/174, 154

[56] References Cited

U.S. PATENT DOCUMENTS

| | | | |
|---|---|---|---|
| 3,602,889 | 8/1971 | Gayman et al. | 364/200 |
| 3,810,114 | 5/1974 | Yamada et al. | 364/200 |
| 3,956,737 | 5/1976 | Ball | 364/200 |
| 4,193,127 | 3/1980 | Gersbach | 365/174 |
| 4,554,645 | 11/1985 | Furman | 365/174 X |
| 4,654,780 | 3/1987 | Logsdon et al. | 364/200 |

OTHER PUBLICATIONS

Stone, Microcomputer Interfacing, 1982, FIG. 4.7, p. 133.
IGEL, IBM Technical Disclosure Bulletin, vol. 17, No. 12, May 1975, pp. 3708–3710.

Primary Examiner—Gary V. Harkcom
Assistant Examiner—Mark K. Zimmerman
Attorney, Agent, or Firm—Staas & Halsey

[57] ABSTRACT

In a microcomputer in which a random access memory and a central processing unit are mounted on one chip and connected therebetween by a bus line. Bit lines of the memory are extended to internal registers of the central processing unit and a connecting portion which can read and write is provided therebetween. When data of the internal register is saved, one word line of the memory is selected and each bit of the data is transferred at the same time to a memory cell group connected to the word line.

7 Claims, 8 Drawing Sheets

HIGH SPEED STACK CIRCUIT FOR REGISTER DATA IN A MICROCOMPUTER

This is a continuation of copending application Ser. No. 863,886 filed on May 16, 1986 now abandoned.

BACKGROUND OF THE INVENTION

1. Field of the Invention

The present invention relates to a high speed stack circuit for a register in a one chip microcomputer.

2. Description of the Related Arts

A microcomputer mounting a CPU (central processing apparatus), ROM (read only memory), RAM (random access memory), etc., on one chip transfers data in each portion by using common bus lines. When an operation is carried out by absorbing the data from the RAM to internal registers of the CPU, the process is carried out by issuing an instruction previously stored in the ROM.

Such program can be latched as a routine formed usually by many instructions. In such a process, when a main routine is carried out with a constant order, if an IRQ (interrupt request) is caused by an external source when the routine reaches a certain step, the process of the main routine must be discontinued at that step and the IRQ routine processed with priority. In this case, since the IRQ routine also utilizes many registers, the following stack process is required. That is, the content of the registers, in the state wherein execution of a certain main routine is saved to a region of the RAM instructed by a stack pointer, and subsequently, upon completion of the processing of the IRQ routine, processing of the main routine is resumed from an instruction following the certain instruction, and thus the saved content is restored in the previously used registers.

If, as in the conventional stack system, an internal BUS is used, one cycle is required per one register transfer (it is assumed that the number of bits of the register is the same as the number of lines of the bus). This leads to a disadvantage in that larger the number of registers, the more time is required for the stack. A similar situation occurs when it is returned from the IRQ routine by a return interrupt instruction (RTI).

To improve this situation, a system has been proposed in which registers exclusively used for the stack are provided internally in the CPU. According to this system, since a data stack for the RAM is not necessary, a high speed can be realized (stacked can be accomplished by one cycle). However, the registers exclusively used for the stack are exclusive hardware, and thus can not be used for storing and reading arbitrary data such as in a RAM, and accordingly can not be used for another purpose. Especially, nesting is restricted by the capacity of the stack exclusive registers, and consequently for a multistage nesting, multi-stage stack exclusive registers must be provided. This means that a large register capacity is required, but further, since these registers are not always used, much of the capacity is wasted.

SUMMARY OF THE INVENTION

A present invention intends to provide a parallel processing of the stack from the internal registers of the CPU to the RAM by using bit lines extented from the RAM.

The characteristic feature of the present invention is that, in a circuit for high speed stacking of the data of the internal registers in the central processing apparatus of a microcomputer in which a random access memory and a central processing apparatus are mounted on one chip, and these RAM and CPU are connected by a bus line, bit lines of the memory are extended to internal registers of the central processing apparatus and a connecting portion which can read and write is provided therebetween. Thus, when the data of the internal registers is stacked, one word line of the memory is selected and each bit of the data is transferred at the same time to a memory cell group connected to the word line through the extended bit line of the memory.

Further features and advantages of the present invention will be apparent from the ensuing description, with reference to the accompanying drawings, to which, however, the scope of the invention is in no way limited.

DESCRIPTION OF THE PREFERRED EMBODIMENTS

Figure 1A:
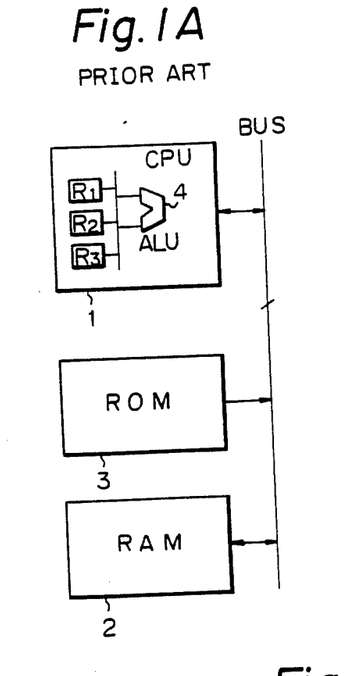
FIGS. 1A, 1B, and 1C are diagrams explaining an operation of a conventional one-chip microcomputer.

A one chip microcomputer on which a CPU (central processing unit), ROM (read only memory), RAM (random access memory), etc., are mounted transfers the data in each portion by utilizing a common BUS (bus line as shown in FIG. 1A). That is, when an operation is carried out by absorbing the data from a random access memory (RAM)2 to internal registers $R_1$, $R_2$, . . . of a central processing unit (CPU)1, the procedure is carried out by issuing an instruction previously stored in a read only memory (ROM)3. For example, when registers $R_1$, $R_2$ in the CPU (1) are defined as accumulators A, B, and the additional operation A+B is carried out in the ALU (arithmetic logic unit)4 in the CPU, the program thereof will be substantially expressed as follows.

| | |
|---|---|
| $M_1 \rightarrow A$ | MOV |
| $M_2 \rightarrow B$ | MOV |
| $A + B \rightarrow A$ | ADD |

The first step shows that the data in the RAM address $M_1$ is moved (MOV) to an accumulator A; the second step similarly shows that the data in the RAM address $M_2$ is moved to an accumulator B; and the third step shows that the contents of the accumulators A, B are added (ADD) and the added result is written in the accumulator A.

Figure 1B:
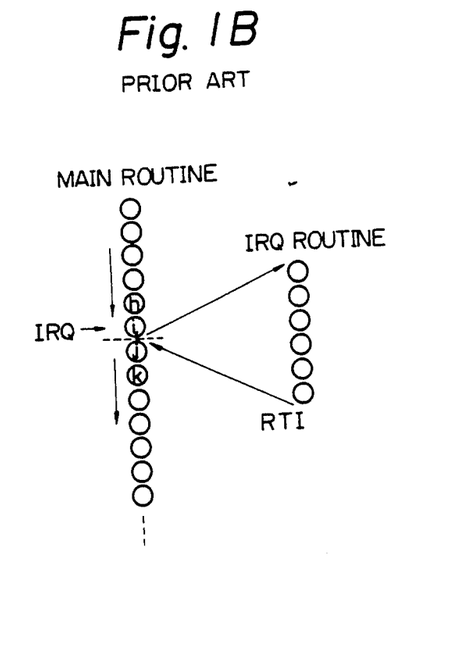
Figure 1C:
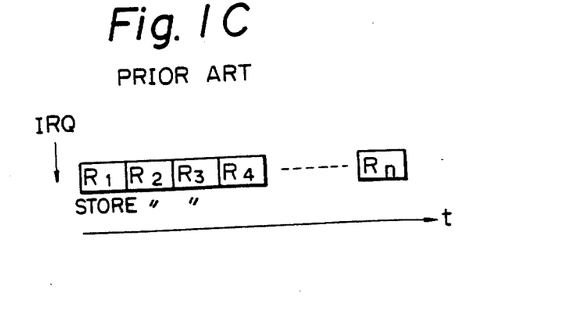

Such a program can be latched as a routine formed usually by many instructions. Now, as shown in FIG. 1B, when a main routine is carried out with a constant order . . . , h, i, j, k, . . . , if an IRQ (interrupt request) is caused from an external source when the step reaches step i, the process of the main routine must be discontinued at that step and the IRQ routine processed with priority. In this case, since the IRQ routine also utilizes registers $R_1$, $R_2$, . . . , the stack process is required as shown in the example of FIG. 1C. Namely, the content of the registers $R_1$, $R_2$, . . . in the state of executing the main routine up to the instruction i is saved to a region of the RAM instructed by a stack pointer, and upon completion of the processing of the IRQ routine, the processing of the main routine is resumed from an instruction following instruction i, and the saved content can be returned to the registers $R_1$, $R_2$, . . . .

In the conventional stack system, as already mentioned, the internal BUS is used for saving the content of the registers $R_1$, $R_2$ . . . , and a certain time for one cycle is required per one register transfer (it is assumed that the number of bits of the register is the same as the number of lines of the bus). This brings a drawback in that the larger the number of registers, the more time required for the stack transfer operation. FIG. 1C shows the stack process of n internal registers $R_1 \sim R_n$ along a time axis t, and a stack of all register data is completed from the time at which an IRQ occurs to an n cycle. A similar procedure occurs when it is returned from the IRQ routine by a return interrupt RTI.

The present invention intends to provide a parallel processing of the stack from the internal registers of the CPU to the RAM by using bit lines extended from the RAM which are a special route being different from the common bus lines.

Figure 2A:
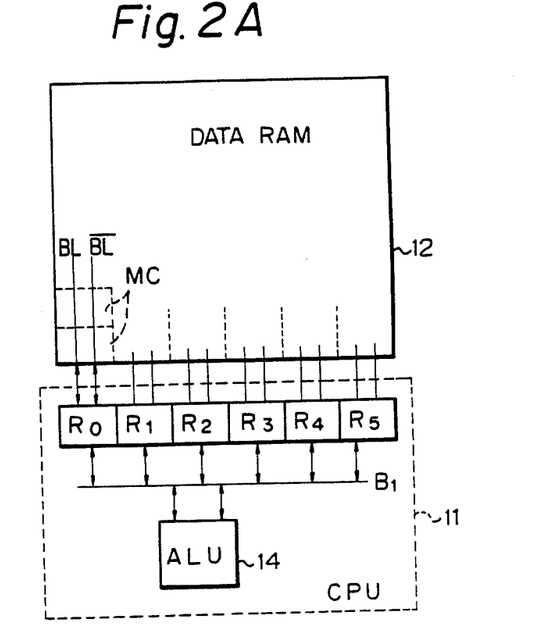
FIGS. 2A and 2B are diagrams showing an outline of the construction according to the present invention.
Figure 2B:
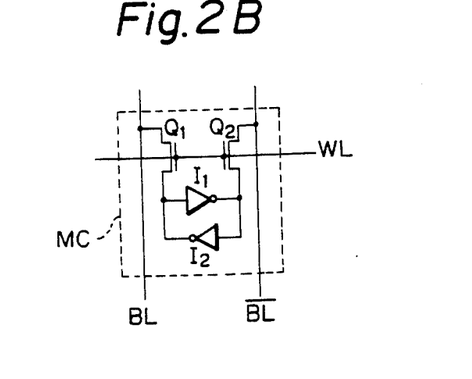

FIGS. 2A and 2B are schematic diagrams of the present invention, that is, FIG. 2A is a diagram showing an essential portion of a CPU (central processing unit)11 and a RAM (random access memory) 12, and FIG. 2B is a diagram showing construction of a memory cell in the CPU11. In the drawing, BL and $\overline{BL}$ are a pair of bit lines, MC is, in this embodiment, a static type memory cell, $R_0$, $R_1$, . . . are internal registers in the CPU11, ALU14 is an arithmetic logic unit, and WL is a word line. The memory cell MC is formed as a flip-flop type, in which the inverters $I_1$ and $I_2$ are crossconnected, and is connected via transfer gates $Q_1$, $Q_2$ to the bit lines BL, $\overline{BL}$, as shown in FIG. 2B. As shown in FIG. 2A, each bit of the internal registers $R_0$, $R_1$ . . . in the CPU11 is directly connected (in detail, via a gate not shown in the drawing) to each pair of bit lines of the data RAM12.

Figure 3:
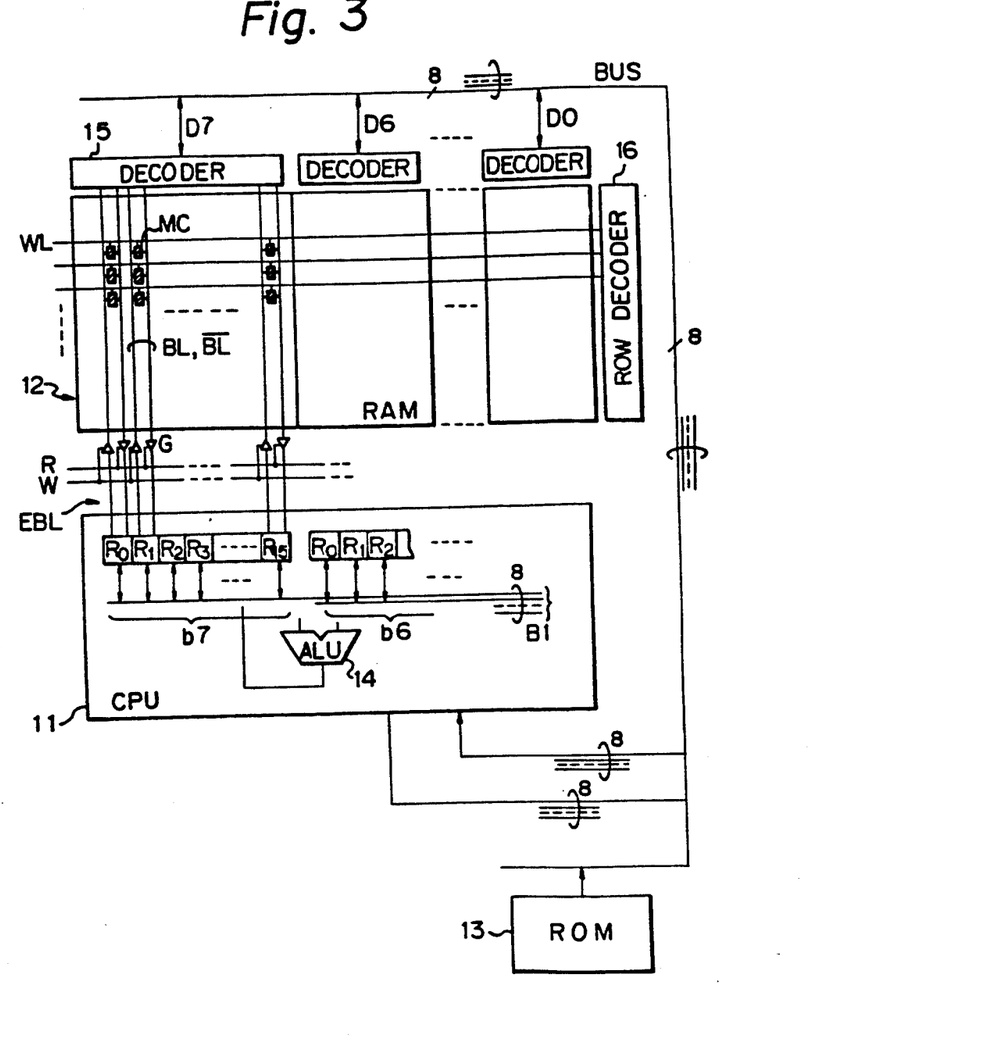
FIG. 3 is a diagram showing details of the block diagrams shown in FIGS. 2A and 2B.

FIG. 3 is a diagram showing details of FIG. 2A. In the embodiment, a one chip microcomputer is formed as an 8 bit type, and an eight data bus (BUS) is connected between the RAM12 and CPU11. The RAM12 is divided into eight regions $D_0 \sim D_7$, assuming that there are 128 pairs of bit lines BL, $\overline{BL}$, then there are 16 pairs of bit lines in each region. The 16 pairs of bit lines are connected via a selection gate, not shown in the drawing, and a decoder 15 to a data bus (BUS), and since the eight regions $D_0 \sim D_7$ are each formed as one bit, accordingly eight bits are formed in the former portion. In each region, a plurality of word lines WL run horizontally to a row decoder 16, these are crossed by a plurality of bit lines in the vertical direction, and a memory cell MC is arranged at each cross point. Assuming that in the present embodiment, one bit is provided for each pair of bit lines, then the 16 eight bit internal registers can be provided in the CPU. $R_0$, $R_1$, . . . , $R_{15}$ denote these 16 registers, in the CPU11 or each bit thereof, and $b_7$, $b_6$, . . . in the CPU11 show an eighth bit, a seventh bit, ... of each register. $B_1$ in the CPU11 shows an internal bus in the CPU11, eight of which buses are shown in this example. A connecting portion of the RAM 12 and a common bus BUS is same as usually used, but in the present invention, in the pair of each bit lines in the RAM, the side opposite to the connecting portion is extended and connected via gates G to each bit of the internal registers in the CPU11. Therefore, the CPU11 and RAM12 are adjacent to each other on the chip, as shown in FIG. 3.

A usual data transmission between the CPU11 and RAM12 is carried out by using the bus line BUS. Gates and decoders controlled by the output of the decoder exist between the BUS and each data bit region of the RAM12, and only selected 8 bit line pairs are connected to the eight bit bus BUS, whereas the save and recapture of the data of the internal registers $R_0$, $R_1$, . . . , $R_{15}$ are carried out directly via the extended portion EBL of the bit wires without going via the common bus BUS. For example, the data bits $b_7$, $b_6$, . . . in the register $R_0$ are stored, via the extended portion EBL of the bit lines, in the regions $D_7$, $D_6$, . . . of the RAM12. This is the same for the other registers $R_1$, $R_2$, . . . , and therefore, all bits $D_7 \sim D_0$ of all registers $R_0 \sim R_{15}$ are saved to the RAM12 simultaneously. The stacked position is a memory cell group connected to a word line selected by a stack pointer. By this process, the data can be stacked with a small number of cycles regardless of the number of internal registers in the CPU11, and is advantageous in that nesting can be made deep in accordance with the number of the word lines of the RAM12.

Figure 4:
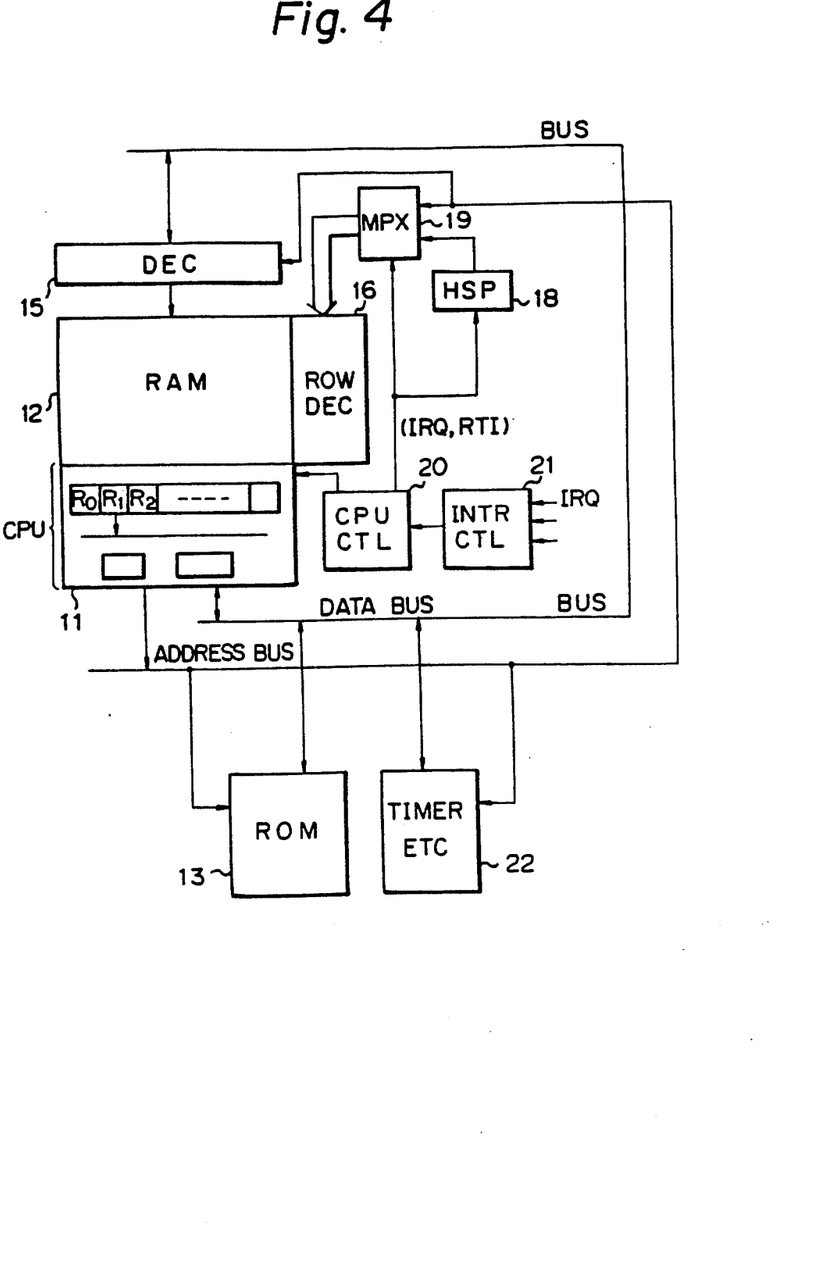
FIG. 4 is a block diagram of one embodiment of the present invention.

FIG. 4 is a schematic block diagram showing one embodiment of the present invention. In FIG. 4, same portions as in FIG. 3 are shown by the same reference numerals and symbols. The DEC16 is a decoder for selecting a word line of the RAM12, the input of the DEC is supplied from an address bus during a usual operation. However, during an interruption (IRQ) and a return interrupt instruction (RTI), the input for DEC 16 is switched to the address from a hardware stack pointer HSP18. MPX19 denotes a multiplexer used for this purpose, which is controlled by the output of the CPU controller CPU CTL20. INTR CTL21 denotes an interrupt controlling portion and causes the CPU CTL20 to operate when the interrupt IRQ is sensed. Further, usually, a timer TIMER22, etc., are provided as a peripheral circuit.

Figure 5:
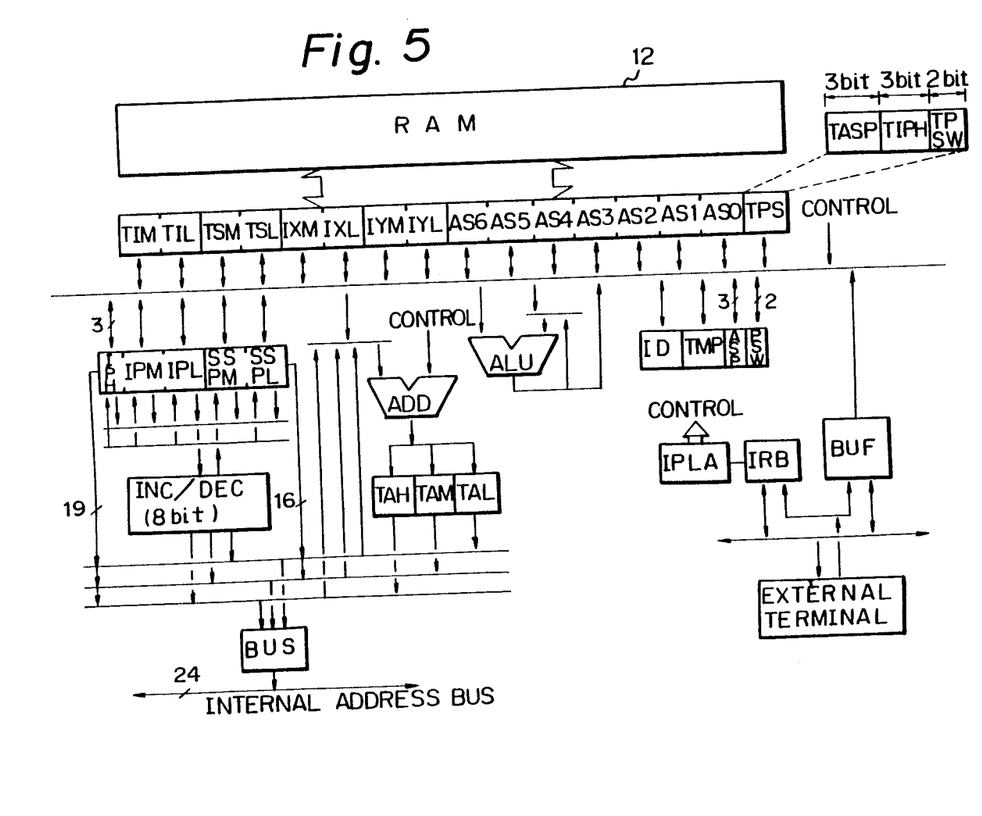
FIG. 5 is a block diagram showing the CPU in FIG. 3 in detail.

FIG. 5 is a detailed diagram of the CPU, wherein TIM~TPS are internal registers. Among these, AS0-~AS6 are accumulator stacks, IX, IY are index registers, and the temporary-use registers are shown by the prefix T. H, L, M denote High, Low, and Middle, registers, respectively, which contain the high, low and middle bits of the operation result produced by the adder ADD. In addition to these internal registers, there are a program counter IP, a software stack pointer SSP, an increment/decrement circuit INC/DEC, and these units determine the position of the address to be interrupted. ADD is an adder for address calculation, ALU is an operator in the internal register, and PSW is a program status word.

Figure 6:
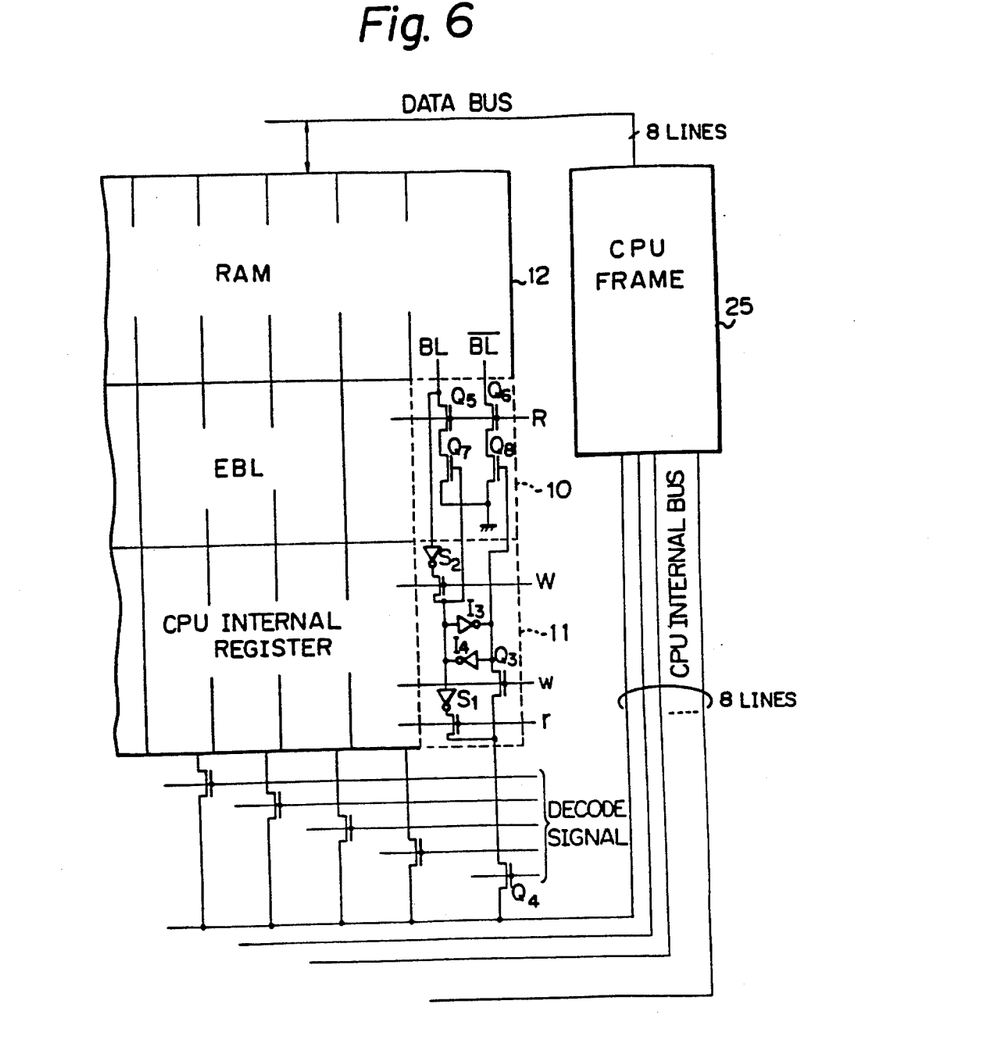
FIG. 6 is a diagram showing a connecting portion between internals registers of the CPU and RAM in FIG. 4 in detail.

FIG. 6 is a detailed diagram of a connecting portion 10 between the internal register in the CPU11 and the RAM12, wherein inverters $I_3$, $I_4$ form one bit of the internal register. A gate $Q_3$ for write and a gate $S_1$ for read exist between this internal register and the internal bus of the CPU11. The gate $Q_3$ is a transistor which turns ON when a write signal W is placed H (high) at the time of a usual operation. On the other hand, the gate $S_1$ is an inverter type switch which turns ON when a read signal r is placed H at the time of a usual operation. These signals w, r are output from the CPU frame 25. However, as the internal BUS in the CPU11 is commonly used by the registers $R_0 \sim R_{15}$, any register can be selected by transfer gate $Q_4$, . . . . Therefore, the decode signal for this process is also formed in the CPU frame 25. The diagram to this point shows a function which exists in a usual one chip microcomputer, however, in this embodiment, a connecting portion 10 formed by gates $Q_5 \sim Q_8$ and a switch $S_2$ are added thereto, so that the internal register in the CPU11 can be directly connected to the RAM12.

That is, the write from the RAM12 to the internal register in the CPU11 (recapture of saved data) is carried out so that the inverter $S_2$ is turned ON by the write signal W and an electric potential of one bit line BL is applied to a bit of the register, or more precisely in this embodiment, to an input of the inverter $I_3$. At this time, in the RAM12, side, the word line WL selected at the time of the interruption is again selected, and a potential difference H, L is supplied to the pair of bit lines BL, $\overline{BL}$ by the information of a memory cell connected to the word line. Therefore, by adding the potential of the bit line BL to the bit of the register via the inverter switch $S_2$, the bit (flip-flop) is set and reset, thus the recapture of the saved data is carried out. Conversely, when the data is transferred (saved) from the internal register in the CPU11 to the RAM12, the gates $Q_5$, $Q_6$ are turned ON by a signal R, and the switches $Q_7$, $Q_8$ are driven by the complementary output of the bits $I_3$, $I_4$ of the register. For example, the output of $I_3$ is H and the output of $I_4$ is L, the transistor $Q_8$ turns ON and the transistor $Q_7$ turns OFF. Then, the bit line $\overline{BL}$ becomes L, BL becomes H, and, in the cell MC in FIG. 2B, the output of the inverter $I_2$ becomes H and the output of $I_1$ becomes L. Thus, the content of the registers $I_3$, $I_4$ is saved to the side of the RAM12. As already mentioned, the position to be saved is selected by the word line WL. The signals R, W at the time of the save are also formed in the CPU11, and the word line to be selected is determined by the stack pointer. The inverter $S_2$ has a function of a sense amplifier and the switches $Q_7$, $Q_8$ have a function of a write amplifier.

Figure 7:
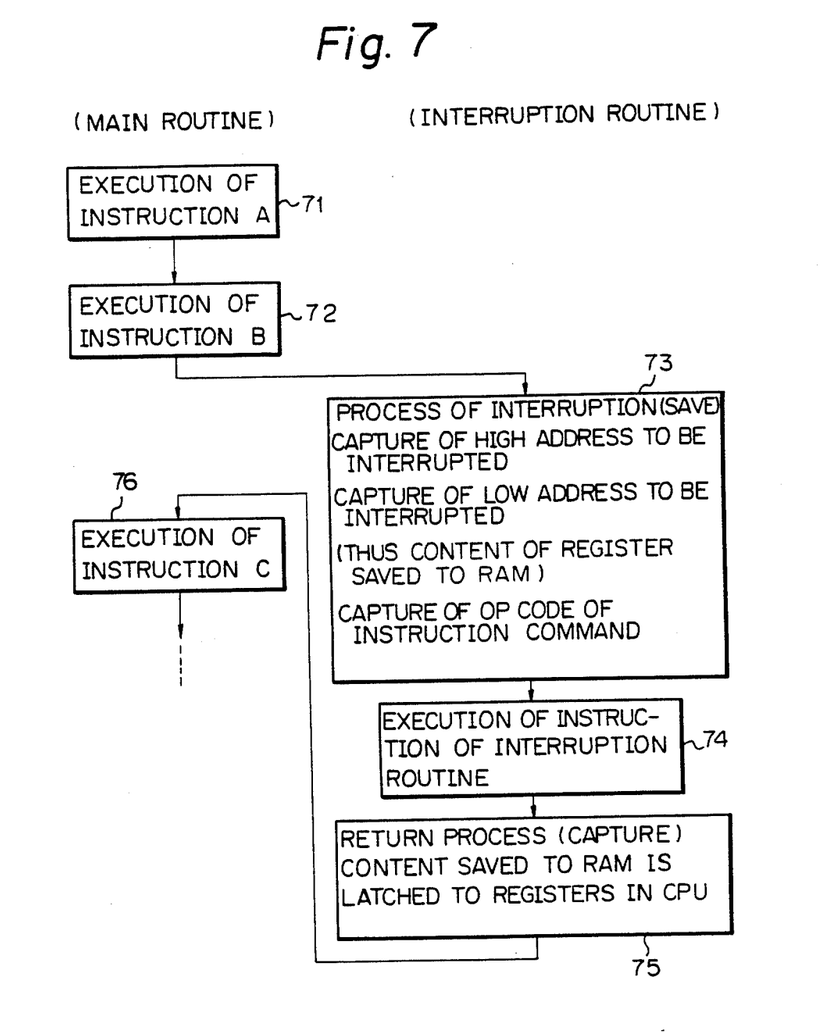
FIG. 7 is a flowchart explaining the operation of stacking the register data.

It is not necessary to cause a special speed up of the direct transmission between the above-mentioned RAM12 and the internal register in the CPU11, because a time margin, usually about 3 cycles, exists from the time to the interruption to the time when the stack is completed. For example, when executing the instruction A as shown in a block 71 of FIG. 7 and then executing the next instruction B as shown in block 72 in FIG. 7. If the interruption occurs while the instruction B is executed as shown in block 73 of FIG. 7, it is necessary to then latch H (high) and L (low) bits in the address of the instruction to be interrupted and subsequently, to latch the OP code of the next instruction as shown in block 73 of FIG. 7. This requires about three cycles, and the save may be carried out during this time. Next, the instructions of the interruption routine are executed as shown in block 74. After that, the saved data is latched to the registers in CPU as shown in block 75 of FIG. 7 and the instruction C is effected as shown in block 76 of FIG. 7.

Figure 8:
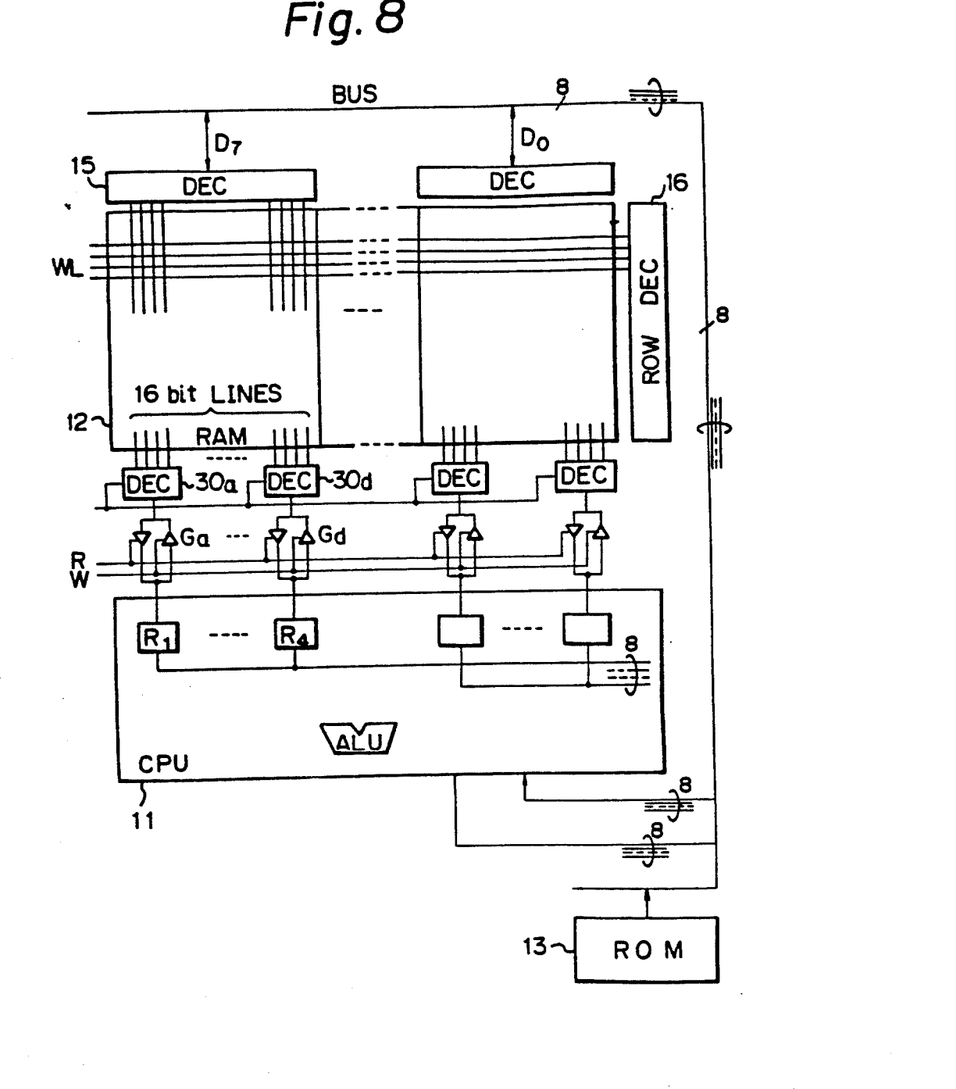
FIG. 8 is a diagram showing another embodiment of the present invention.

FIG. 8 shows another embodiment of the present invention. The basic idea of the embodiment shown in FIG. 8 is similar to that shown in FIG. 3. The difference between FIG. 3 and FIG. 8 is that four decoders $30a \sim 30d$ are provided for 16 bit lines, and the decoded outputs of the decoders $30a \sim 30d$ are supplied via four pairs of gates $Ga \sim Gd$ to four internal registers $R_1 \sim R_4$. Of course, the decoders are controlled by the hardware stack pointer shown in FIG. 3. The embodiment shown in FIG. 8 is effective when the number of internal registers in CPU11 is small, and the region of the RAM12 can be effectively used.

As mentioned above, according to the present invention, the data in the internal registers in the CPU can be saved to the RAM by using the bit lines, therefore the advantage of transferring to the interruption routine with a small number of cycles and of returning from the routine can be obtained. Further, a residual region of the RAM can be used for the stack, and thus nesting can be arbitrarily carried out without taking into consideration the capacity of the register for stacking.

I claim:

1. A microcomputer, comprising:
   a central processing unit producing an address and including internal registers storing data of plural bits;
   random access memory separate from said central processing unit, accessed by the address and including word lines, a fit number of bit lines and memory cells at intersections of the word and bit lines;
   a data bus having a second number of data bus lines smaller than the first number, connected between said random access memory and said central processing unit, for transferring data, having a plurality of bits, between said random access memory and said central processing unit; and
   a connection portion, separate from said data bus and connected between the bit lines of the random access memory and the internal registers, having the first number of conductors greater than the second number of the data bus lines, for transferring data between the internal registers and the bit lines, coupling, responsive to control by said central processing unit, the internal registers to the bit lines and transferring simultaneously, without using said data bus lines, a larger number of bits from said internal registers to said bit lines than can be transferred over said data bus.

2. A microcomputer according to claim 1, wherein said connection portion comprises a write gate and a read gate for each bit line of said memory, said write and read gates being connected to a corresponding bit line of said memory and to each of said internal registers, and said write gate sand said read gate are controlled by a write signal and a read signal respectively.

3. A microcomputer according to claim 2, wherein each read gate comprises first and second transistors connected in series between a bit line BL and ground, third and fourth transistors connected in series between a bit line BL and ground, an invertor connected between the bit line BL and one terminal of one of said internal registers in said central processing unit, said second and fourth transistors are respectively connected to the one and a different terminal of the one of said internal registers in said central processing unit, and during data transfer from said random access memory to said central processing unit, said invertor is activated to apply a potential to said internal register, and during a data transfer save from said central processing unit to said random access memory, said first and third transistors are activated and complemental outputs of said internal registers are supplied to said second and fourth transistors.

4. A microcomputer according to claim 1, wherein said memory has n bit lines and said connection portion comprises:
   a decoder for the n bit lines of said memory, said decoder having inputs connected to said n bit lines of said memory and having outputs, and
   a write gate and a read gate for every output of said decoder, each being connected to a respective output of said decoder and to each of said internal resisters and said write gate and said read gate are controlled by a write signal and a read signal, respectively.

5. A microcomputer according to claim 3, wherein each write gate comprises first and second transistors connected in series between a bit line BL and ground, third and a fourth transistors connected in series between a bit line BL and ground, an invertor connected between the bit line BL and one terminal of one of said internal registers in said central processing unit, said second and fourth transistors are respectfully connected to the one and a different terminal of the one of said internal registers in said central processing unit, during data transfer from said random access memory to said central processing unit, said invertor is activated to apply a potential to said internal register, and during a data transfer save from said central processing unit to said, said first and third transistors are activated and complemental outputs of said internal registers are supplied to said second and fourth transistors.

6. A microcomputer, comprising:
   a central processing unit having internal registers each having input/output lines;
   a data bus connected to said central processing unit and having a first number of bus lines;
   random access memory separate from said central processing unit, connected to said data bus and having a second number of bit lines at least equal to a total number of said input/output lines and greater than the first number; and
   connection means, separate from said data bus, for connecting the internal register input/output lines to the bit lines, said central processing unit accessing said random access memory via said data bus by selecting the first number of bit lines and accessing said random access memory via said connection means by selecting the second number of bit lines for simultaneous transfer of contents of the internal registers.

7. A microcomputer according to claim 6, wherein said internal registers are stack registers and said connection means transfers data between all said stack registers and said random access memory simultaneously.

* * * * *